United States Patent
Cho

(10) Patent No.: US 12,325,308 B2
(45) Date of Patent: Jun. 10, 2025

(54) METHOD AND SYSTEM FOR CONTROLLING ANTI-JERK OF xEV VEHICLE

(71) Applicants: HYUNDAI MOTOR COMPANY, Seoul (KR); KIA CORPORATION, Seoul (KR)

(72) Inventor: Woo Cheol Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 474 days.

(21) Appl. No.: 17/960,934

(22) Filed: Oct. 6, 2022

(65) Prior Publication Data
US 2023/0202308 A1 Jun. 29, 2023

(30) Foreign Application Priority Data
Dec. 29, 2021 (KR) .................. 10-2021-0191755

(51) Int. Cl.
| | | |
|---|---|---|
| *B60W 50/00* | (2006.01) | |
| *B60L 15/20* | (2006.01) | |
| *B60L 50/61* | (2019.01) | |
| *B60L 58/10* | (2019.01) | |
| *B60W 10/08* | (2006.01) | |
| *B60W 20/13* | (2016.01) | |
| *B60W 30/20* | (2006.01) | |
| *H02P 23/00* | (2016.01) | |

(52) U.S. Cl.
CPC .............. *B60L 15/20* (2013.01); *B60L 58/10* (2019.02); *H02P 23/0022* (2013.01); *B60L 2240/421* (2013.01); *B60L 2240/423* (2013.01)

(58) Field of Classification Search
CPC ...... B60W 10/08; B60W 20/13; B60W 20/50; B60W 30/20; B60W 50/10; B60W 2050/0022; B60W 2050/0055; B60W 2050/0056; B60W 2510/081; B60L 15/20; B60L 58/10; B60L 2240/421; B60L 2240/423; H02P 23/0022; H02P 21/05; Y02T 10/72; Y02T 10/62; Y02T 10/70; Y02T 10/7072; Y02T 90/40; B60Y 2200/91; B60Y 2200/92
See application file for complete search history.

(56) References Cited

U.S. PATENT DOCUMENTS

| | | | | |
|---|---|---|---|---|
| 6,574,535 | B1* | 6/2003 | Morris ................... | B60K 6/44 180/65.6 |
| 6,806,667 | B1* | 10/2004 | Sasaki ................... | B60K 6/547 318/434 |
| 2014/0107877 | A1* | 4/2014 | Bang ...................... | B60L 15/20 701/22 |
| 2016/0375894 | A1* | 12/2016 | Kawai ................... | B60W 10/08 701/22 |
| 2019/0217852 | A1* | 7/2019 | Komoda ............... | B60W 10/06 |
| 2023/0318501 | A1* | 10/2023 | Yamamoto ............ | H02P 23/12 701/22 |

* cited by examiner

*Primary Examiner* — Tinh Dang
(74) *Attorney, Agent, or Firm* — Morgan Lewis & Bockius LLP

(57) ABSTRACT

A system for controlling anti jerk of an xEV vehicle using power of a motor, includes a battery configured to supply driving power to the motor, a battery control unit (BCU) configured to manage and control charging and discharging of the battery, and a motor control unit (MCU) configured to control driving of the motor, wherein the motor control unit is configured to execute a command for performing a method of controlling anti-jerk of an xEV vehicle.

18 Claims, 8 Drawing Sheets

METHOD AND SYSTEM FOR CONTROLLING ANTI-JERK OF xEV VEHICLE

CROSS-REFERENCE TO RELATED APPLICATIONS

The present application claims priority to Korean Patent Application No. 10-2021-0191755, filed on Dec. 29, 2021, the entire contents of which is incorporated herein for all purposes by this reference.

BACKGROUND OF THE PRESENT DISCLOSURE

Field of the Present Disclosure

The present disclosure relates to a method and a system for controlling anti jerk of an xEV vehicle, and more particularly, to a method and a system for controlling anti jerk of an xEV vehicle capable of correcting a model speed in consideration of an impact generated in a backlash region while controlling anti-jerk to thereby effectively reduce vibration and improve drivability.

Description of Related Art

Recently, eco-friendly vehicles are actively spreading globally due to environmental regulations.

Examples of eco-friendly vehicles include a hybrid electric vehicle (HEV), an electric vehicle (EV), a fuel cell electric vehicle (FCEV), etc.

Vehicles that use a motor as power, such as an electric vehicle, reduce vibration through anti-jerk control of the motor. At the instant time, extracting a vibration component accurately is most important. Generally, the vibration component is extracted using a difference between a motor speed and a model speed, and then the same is passed through a high-pass filter to remove an error component. However, when controlled by the related art method, there is a problem in that the vibration is rather aggravated by a driveline backlash impact due to driving/regenerative switching of the vehicle. In other words, when the direction of a driving motor is changed (+ driving torque→− regenerative torque or − regenerative torque→+ driving torque), a backlash impact occurs, and thus the vibration component is not accurately extracted. This is because a large change in motor speed caused by the backlash impact is extracted as a vibration component, which is incorrect.

FIG. 1 is a diagram for explaining the related art method of controlling anti-jerk.

Referring to FIG. 1, when vibration is not generated, an actual motor speed in step S11 and a model speed in step S12, which may be considered as correct answers, are detected, and a difference between the actual motor speed and the model speed is extracted as a vibration component in step S13. There are several ways to determine the model speed, but it is nearly impossible to accurately determine the same, whereby an error component is inevitably generated. For the present reason, a high-pass filter in step S14, a phase delay in step S15, a gain in step S16, and applying an anti-jerk torque in step S17 are used to remove the error component.

However, in the related art document, in a situation of passing through a driveline backlash region due to drive/regenerative switching, a motor speed changed by a backlash impact is extracted as a vibration component, so that the vibration component is erroneously extracted to deteriorate the vibration reduction performance or rather induce vibration.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and a system for controlling anti jerk of an xEV vehicle that substantially obviate one or more problems due to limitations and disadvantages of the related art.

An object of the present disclosure is to provide a method and a system for controlling anti-jerk of an xEV vehicle capable of correcting a model speed in consideration of an impact generated in a backlash region while controlling anti-jerk to thereby effectively reduce vibration and improve drivability.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the present disclosure, as embodied and broadly described herein, provided is a method of controlling anti-jerk of an xEV vehicle using power of a motor, the method including determining whether a region is a backlash region where a direction of output torque of the motor is changed due to driving/regenerative switching, determining a model speed of the motor and an actual motor speed of the motor, low-pass filtering an impact component to remove an error component including the impact component from the determined actual motor speed when the region is determined to be the backlash region as a result of the determination, determining a correction factor through monitoring of the output torque, determining a corrected model speed in which an impact in the backlash region is reflected by collecting the low-pass filtered corrected motor speed, the correction factor, the model speed, and the actual motor speed, extracting a vibration component based on a deviation between the determined corrected model speed and the actual motor speed, high-pass filtering the vibration component to remove an error component included in the vibration component, phase-delaying the filtered vibration component for a predetermined time period to compensate for phase antecedence occurring when the vibration component is high-pass filtered, and generating an anti-jerk compensation torque by applying a set gain value to the filtered vibration component to which set time phase delay is applied.

Furthermore, provided is a system for controlling anti jerk of an xEV vehicle using power of a motor, the system including a battery configured to supply driving power to the motor, a battery control unit (BCU) configured to manage and control charging and discharging of the battery, and a motor control unit (MCU) configured to control driving of the motor, wherein the motor control unit may execute a command for performing the method of controlling anti jerk of the xEV vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
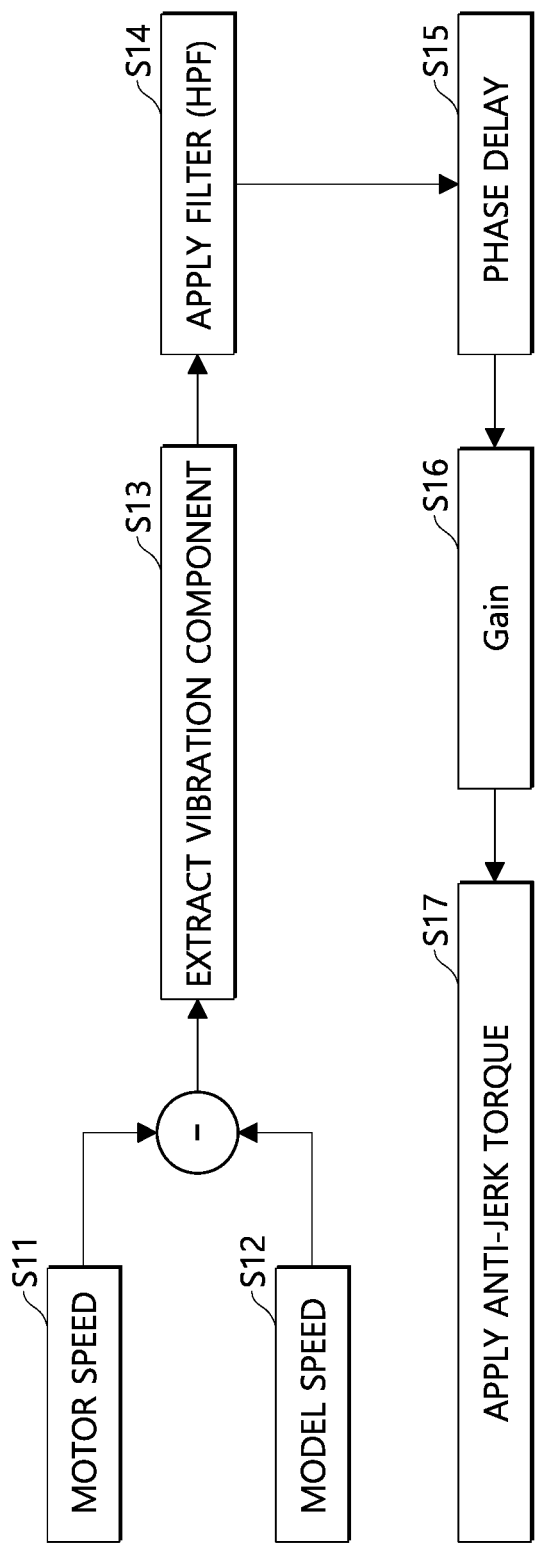
FIG. 1 is a diagram for explaining a related art method of controlling anti-jerk.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, with reference to the accompanying drawings, various embodiments of the present disclosure will be described in detail so that those skilled in the art can easily implement the present disclosure. However, the present disclosure may be implemented in several different forms and is not limited to the embodiments described herein. In order to clearly illustrate the present disclosure, parts not related to the description are omitted, and similar parts are denoted by like reference numerals throughout the specification.

Throughout the specification, when an element is referred to as "including" another element, this means that the element may include another element as well, without excluding other elements, unless specifically stated otherwise. In addition, parts indicated with the same reference numerals throughout the specification refer to the same components.

Furthermore, "unit" or "control unit" included in the name of an xEV control unit (xEVCU) is merely a term widely used in naming a controller that is configured to control a specific function of a vehicle, and does not mean a generic functional unit. For example, each control unit may include a communication device configured to communicate with another control unit or sensor to control the function it is responsible for, a memory configured to store an operating system or logic commands, input and output information, etc., and one or more processors configured to perform judgment, calculation, decision, etc. needed in controlling the function it is responsible for.

The exemplary embodiments of the present disclosure, from the viewpoint of the motor control unit, propose effective reduction of vibration by correcting a model speed in consideration of an impact generated in a backlash region during anti jerk control.

Before describing a method of controlling anti jerk of an xEV vehicle according to an exemplary embodiment of the present disclosure, a structure and a control system of an xEV vehicle which may be applied to the exemplary embodiments will first be described with reference to FIG. 2 and FIG. 3. It is apparent to those skilled in the art that the structure of a vehicle described below with reference to FIG. 2 and FIG. 3 may be similarly applied to an electric vehicle (EV), except for a part related to an internal combustion engine.

Figure 2:
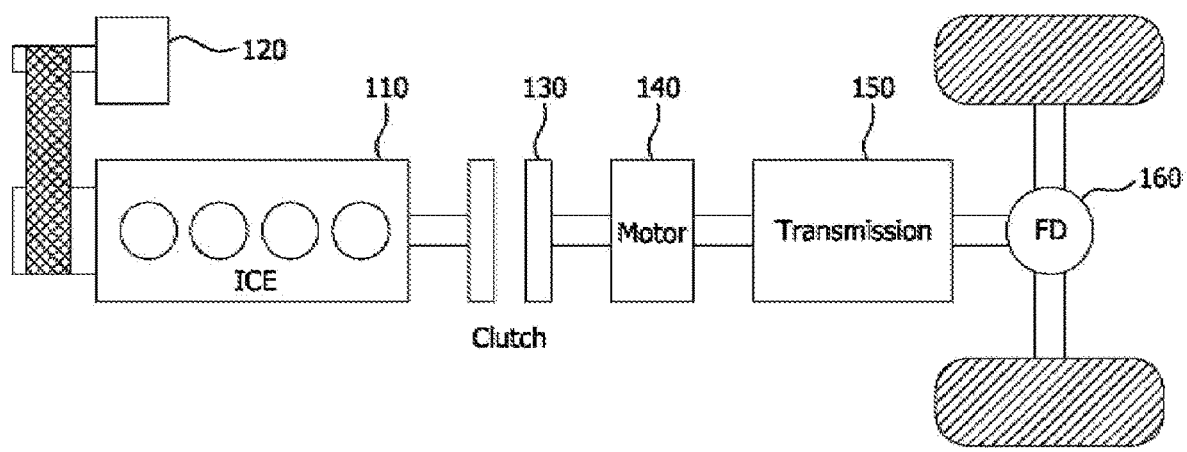
FIG. 2 illustrates an example of the structure of an xEV vehicle which may be applied to various exemplary embodiments of the present disclosure.

FIG. 2 illustrates an example of the structure of an xEV vehicle which may be applied to various exemplary embodiments of the present disclosure.

Referring to FIG. 2, the xEV vehicle according to various exemplary embodiments of the present disclosure may be provided with a parallel type or transmission mounted electric drive (TMED) xEV powertrain apparatus in which an electric motor 140 (or a driving motor) and an engine clutch (EC) 130 are mounted between an internal combustion engine (ICE) 110 and a transmission 150. The xEV powertrain apparatus may include a hybrid powertrain apparatus.

In such a vehicle, generally, when a driver depresses an accelerator pedal after start-up, the motor 140 (or the driving motor) is driven first using the power of the battery 170 in the state in which the engine clutch 130 is opened, and then the power of the motor 140 passes through the transmission 150 and a final drive (FD) 160 to move wheels (i.e., EV mode). When the vehicle is gradually accelerated and a driving force demand is gradually increased, a starter generator motor 120 may operate to drive the engine 110.

Accordingly, the rotation speed of the engine 110 becomes substantially equal to the rotation speed of the motor 140, whereby the engine clutch 130 is engaged so that the engine 110 and the motor 140 together or the engine 110 drives the vehicle (i.e., mode transition from EV mode to HEV mode). When a predetermined engine-off condition is satisfied, such as when the vehicle is decelerated, the engine clutch 130 is opened and the engine 110 is stopped (i.e., mode transition from HEV mode to EV mode). Furthermore, in the xEV vehicle, the battery 170 may be charged by converting the driving force of the wheel into electrical energy during braking, which is referred to as braking energy regeneration or regenerative braking.

Because the starter generator motor 120 is configured as a starter motor when the engine 110 is started, and operates as a generator when the rotational energy of the engine 110 is recovered after the engine is started or when the engine 110 is turned off, the starter generator motor 120 may be referred to as a "hybrid starter generator (HSG)" or an "xEV starter generator", and in some cases, may also be referred to as an "auxiliary motor".

Figure 3:
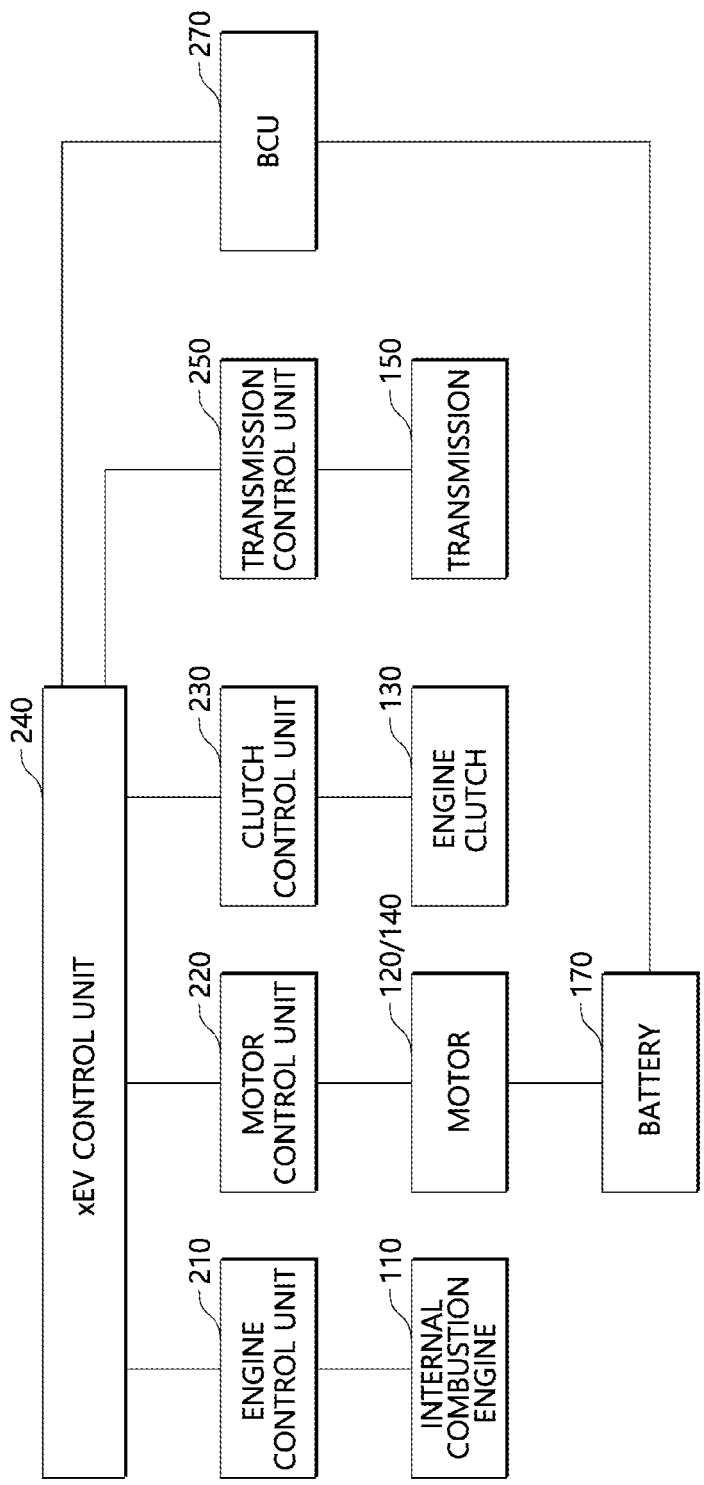
FIG. 3 is a block diagram illustrating an example of a control system of an xEV vehicle which may be applied to various exemplary embodiments of the present disclosure.

FIG. 3 is a block diagram illustrating an example of a control system of an xEV vehicle which may be applied to various exemplary embodiments of the present disclosure. The control system illustrated in FIG. 3 may be applied to a vehicle to which the powertrain apparatus described above with reference to FIG. 2 is applied.

Referring to FIG. 3, in the xEV vehicle to which embodiments of the present disclosure may be applied, the internal combustion engine 110 may be controlled by the engine control unit 210, the starter generator motor 120 and the driving motor 140 may have torque controlled by a motor control unit (MCU) 220, and the engine clutch 130 may be controlled by the clutch control unit 230. Here, the engine control unit 210 is also referred to as an engine management system (EMS). Furthermore, the transmission 150 is controlled by the transmission control unit 250. In some cases, a control unit of each of the starter generator motor 120 and the driving motor 140 may be provided separately.

Each of the control units may be connected to an xEV control unit 240 (xEVCU), which is a parent control unit of the same, configured to control the overall switching process to provide information needed in controlling the engine clutch and/or engine stoppage, when switching driving modes or shifting gears, to the xEV control unit 240 or to perform an operation according to a control signal by the control of the xEV control unit 240. The xEV control unit may be referred to as a hybrid control unit (HCU).

For example, the xEV control unit 240 may perform overall control of a powertrain apparatus when a vehicle travels. For example, the xEV control unit 240 may determine when to open the engine clutch 130. Furthermore, the xEV control unit 240 may determine the status (lock-up, slip, open, etc.) of the engine clutch 130 and control the timing of stopping fuel injection of the engine 110. Moreover, for controlling stoppage of the engine, the xEV control unit 240 may transmit a torque command for controlling the torque of the starter generator motor 120 to the motor control unit 220 to control recovery of rotational energy of the engine.

Furthermore, the xEV control unit 240 may control the motor control unit 220, based on embodiments of the present disclosure to be described later, to determine whether a region is a backlash region where a direction of output torque of the motor is changed due to driving/regenerative switching, to determine a model speed of the motor and an actual motor speed of the motor, to low-pass filter an impact component to remove an error component including the impact component from the determined actual motor speed when the region is determined to be the backlash region as a result of the determination, to determine a correction factor through monitoring of the output torque, to determine a corrected model speed in which an impact in the backlash region is reflected by collecting the low-pass filtered corrected motor speed, the correction factor, the model speed, and the actual motor speed, and to extract a vibration component based on a deviation between the determined corrected model speed and the actual motor speed. Furthermore, the xEV control unit 240 may control the motor control unit 220 to high-pass filter the vibration component to remove an error component included in the vibration component, to phase delay the filtered vibration component for a predetermined time period to compensate for phase antecedence occurring when the vibration component is high-pass filtered, and to generate an anti-jerk compensation torque by applying a set gain value to the filtered vibration component to which set time phase delay is applied.

Of course, it is apparent to those skilled in the art that the above-described connection relationship between the control units and the function/classification of each control unit are exemplary and are not limited by their names. For example, the xEV control unit 240 may be implemented so that the corresponding function is provided by being replaced in any one of the other control units, or the corresponding function may be distributed and provided in two or more of the other control units.

Hereinafter, a method and a system for controlling anti jerk of an xEV vehicle using the power of a motor according to an exemplary embodiment of the present disclosure will be described based on the above-described vehicle structure. It is apparent to those skilled in the art that the above-described connection relationship between the plurality of control units and the function/classification of each control unit are exemplary and are not limited by their names.

Figure 4:
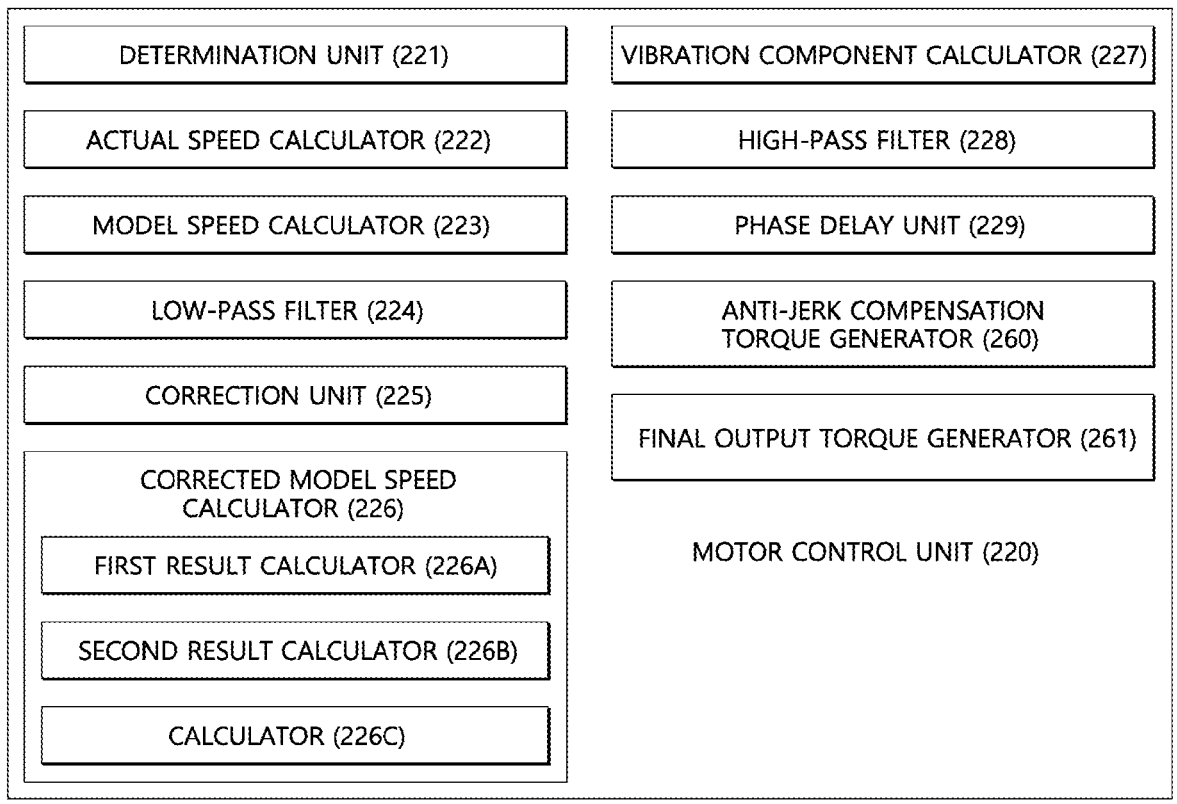
FIG. 4 is a diagram for explaining a system for controlling anti jerk of an xEV vehicle included in a motor control unit according to an exemplary embodiment of the present disclosure.

FIG. 4 is a diagram for explaining a system for controlling anti jerk of an xEV vehicle included in a motor control unit according to an exemplary embodiment of the present disclosure.

Referring to FIG. 4, the system for controlling anti jerk of the xEV vehicle may be included in the motor control unit 220.

Each component of the anti jerk control system according to an exemplary embodiment of the present disclosure included in the motor control unit 220 may be configured as a software program module executed by a microprocessor.

In other words, the motor control unit 220 is one or more microprocessors configured to operate based on a set program, and the set program may be formed of a series of commands for performing the method of controlling anti jerk of an xEV vehicle according to an exemplary embodiment of the present disclosure, which will be described later.

The anti jerk control according to an exemplary embodiment of the present disclosure may be performed in the motor control unit 220. For example, the motor control unit 220 may reduce the impact by driving/regenerative switching when the driving system passes through the driveline backlash region to prevent the occurrence of vibration.

The motor control unit 220 (MCU) may include a determination unit 221, calculators from a first calculator 222 to a fourth calculator 227, filters from a first filter 224 to a second filter 228, a corrector 226, a phase delay unit 229, an anti-jerk compensation torque generator 260, and a final torque generator 261.

The determination unit 221 may determine whether it is a backlash region in which the direction of output torque is changed due to driving/regenerative switching. The determination unit 221 may determine a backlash region in which the direction of the output torque is changed by the control of the motor control unit 220.

The first calculator 222 may determine the actual motor speed of the motor. The first calculator 222 may be referred to as an actual speed calculator 222. The actual speed calculator 222 may detect the motor of the xEV vehicle in travel to measure the actual motor speed by the control of the motor control unit 220. The actual speed calculator 222 may determine the actual speed of the motor using a known technique.

The second calculator 223 may determine the model speed of the motor. The second calculator 223 may be referred to as a model speed calculator 223. The model speed calculator 223 may measure the model speed of the motor of the xEV vehicle in travel by the control of the motor control unit 220. The model speed of the motor may be the motor speed in the absence of vibration. The second calculator 223 may determine the model speed of the motor based on the motor torque command, load torque, gear stage information, traveling status, wheel speed, transmission input/output speed, vehicle mode, and the like. For example, the load torque may include road slope, aerodynamic drag, etc., the traveling status may include tip-in/tip-out, brake, shift, etc., and the vehicle mode may include EV mode, HEV mode, engine clutch slip, etc. However, the present disclosure is not limited thereto.

When the determination unit 221 determines that a region is a backlash region, the first filter 224 may filter the impact component to remove an error component included in the impact component from the determined actual motor speed. The first filter 224 may be referred to as a low-pass filter 224 configured to passes signals with a frequency lower than a predetermined cutoff frequency. In the case of the backlash region under the control of the motor control unit 220, the low-pass filter 224 may perform low-pass filtering to remove the error component included in the impact component. The impact component may be referred to as a backlash impact component or backlash impact.

The corrector 226 may determine a correction factor through monitoring of the output torque. The corrector 226 may monitor the output torque in real time under the control of the motor control unit 220 and determine a correction factor based thereon.

The third calculator 226 may collect the low-pass filtered corrected motor speed, the correction factor, and the actual motor speed to determine the corrected model speed in which the impact in the backlash region is reflected. The third calculator 226 may be referred to as a corrected model speed calculator 226. The corrected model speed calculator 226 may collect all of the corrected motor speed low-pass filtered through the first filter 224 under the control of the motor control unit 220, the correction factor determined by the corrector 226, and the actual motor speed measured by the first calculator 222, determining the corrected model speed accurately. Here, the corrected model speed may be a speed in which the error component is removed and the impact on the backlash region is reflected.

The corrected model speed calculator 226 may include a first result calculator 226a, a second result calculator 226b, and a calculator 226c.

The first result calculator 226a may determine a first result value by multiplying the low-pass filtered corrected motor speed by the correction factor.

The second result calculator 226b may determine a second result value by multiplying the model speed by a value obtained by subtracting the correction factor from a predetermined reference value.

The calculator 226c may determine the corrected model speed by combining the first result value and the second result value. The calculator 226c may collect the first result value determined by the first result calculator 226a and the second result value determined by the second result calculator 226b to determine or extract the corrected model speed.

The fourth calculator 227 may determine a vibration component based on deviation between the corrected model speed and the actual speed. The fourth calculator 227 may be referred to as a vibration component calculator 227. The vibration component calculator 227 may extract or determine the vibration component based on deviation between the corrected model speed determined by the third calculator 226 and the actual speed of the vehicle under the control of the motor control unit 220.

The second filter 228 may filter the vibration component to remove an error component included in the vibration component determined by the fourth calculator 227. The second filter 228 may be referred to as a high-pass filter 228. The high-pass filter 228 configured for passing signals with a frequency higher than a predetermined cutoff frequency may perform high-pass filtering on the vibration component to remove an error component included in the vibration component under the control of the motor control unit 220. For example, the high-pass filter 228 may remove the error component expressed as a function greater than or equal to a linear function based on the Laplace transform. Because the Laplace transform is commonly employed and is obvious to those skilled in the art, a description thereof will be omitted herein.

The phase delay unit 229 may compensate for phase antecedence occurring when the vibration component is filtered by the second filter 228. The phase delay unit 229 may phase delay the high-pass filtered vibration component under the control of the motor control unit 220 for a predetermined time period to compensate for phase antecedence occurring when the vibration component is filtered by the second filter 228.

As described above, the reason for delaying the phase is to compensate for the phase antecedence, which only occurs when an ideal vibration component is output while the vibration component including the error component passes through the high-pass filter 228, and thus the phase of the ideal vibration component precedes the phase due to the characteristics of the high-pass filter 228.

The anti-jerk compensation torque generator 260 may generate an anti-jerk compensation torque by applying a set gain value to a vibration component to which set time phase delay is applied. Here, the set gain value may be a value set based on a traveling mode, gear stage information, and traveling status of the xEV vehicle.

The anti-jerk compensation torque generator 260 may not allow use of the anti-jerk compensation torque when the anti jerk compensation torque is less than or equal to a set lower-limit value under the control of the motor control unit 220. For example, the set lower-limit value may be a value in the case in which drivability and ride comfort are not affected even when the anti jerk compensation torque is applied.

On the other hand, the anti-jerk compensation torque generator 260 may allow use of the anti-jerk compensation torque by limiting the same to a predetermined value when the anti-jerk compensation torque is greater than or equal to a set upper-limit value under the control of the motor control unit 220. For example, the set upper-limit value may be a value in the case in which drivability and ride comfort are adversely affected when the anti jerk compensation torque is applied.

A final output torque generator 261 may combine the anti-jerk compensation torque and a driver demand torque to generate a final output torque. The final output torque generator 261 may collect or combine the anti jerk compensation torque, generated by the anti-jerk compensation torque generator 260 under the control of the motor control unit 220, and the driver demand torque, detected via an accelerator pedal or a brake pedal, to thereby finally generate the final output torque.

Figure 5:
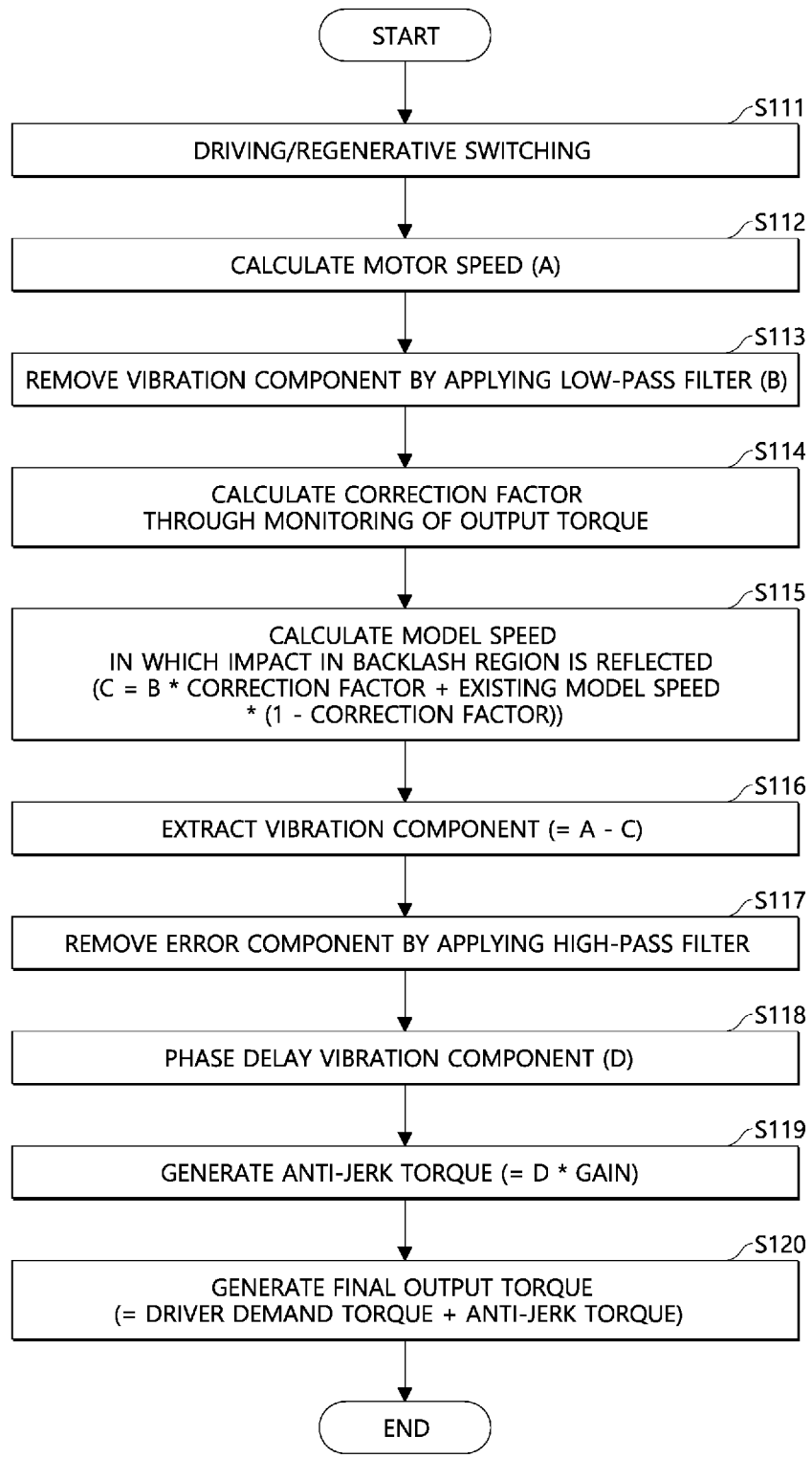
FIG. 5 and FIG. 6 are diagrams for explaining a method of controlling anti jerk of an xEV vehicle using the power of a motor according to an exemplary embodiment of the present disclosure.
Figure 6:
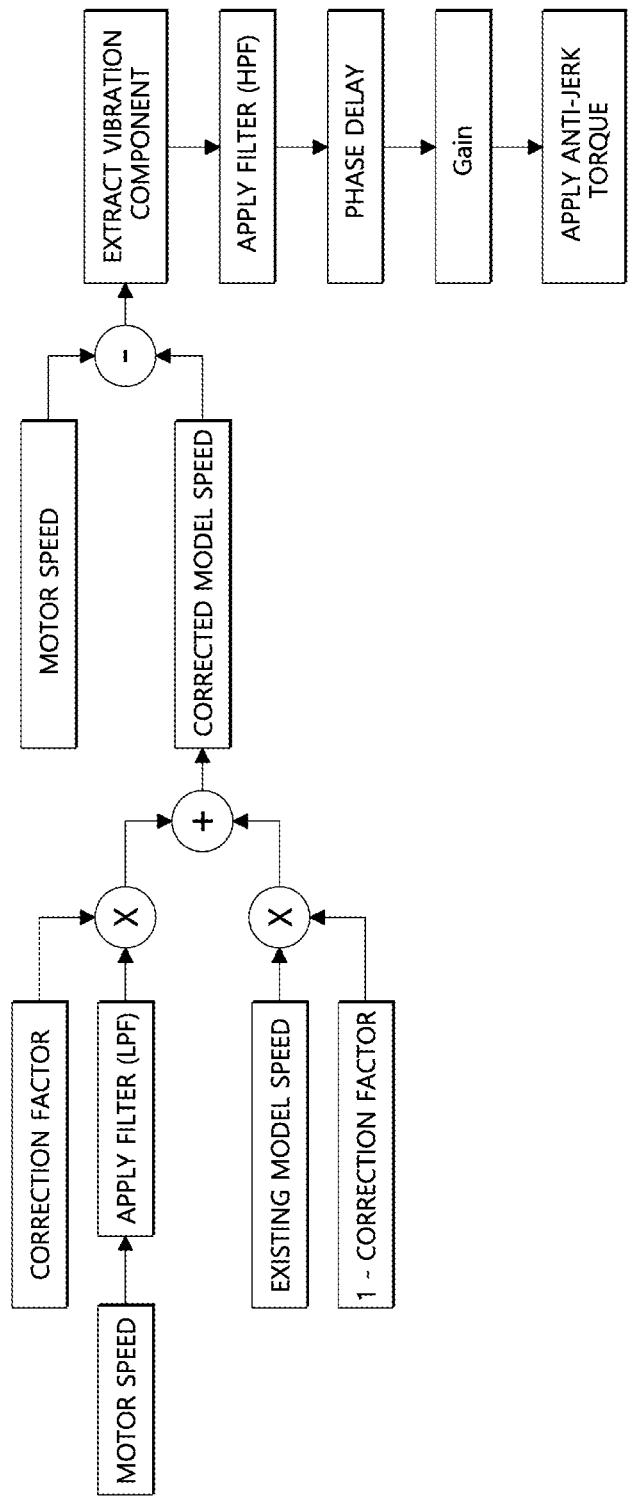

FIG. 5 and FIG. 6 are diagrams for explaining a method of controlling anti jerk of an xEV vehicle using the power of a motor according to an exemplary embodiment of the present disclosure.

Referring to FIG. 5 and FIG. 6, the method of controlling anti jerk of an xEV vehicle of the present disclosure is as follows.

First, determining whether a region is a backlash region, in which the direction of output torque is changed due to driving/regenerative switching, may be performed in step S111. For example, the determination unit 221 may determine a region in which the direction of output torque is changed from a positive driving torque to a negative regenerative torque (+ driving torque→− regenerative torque) or switched from a negative regenerative torque to a positive driving torque (− regenerative torque→+ driving torque) as the backlash region.

Thereafter, determining the model speed of the motor and the actual motor speed of the motor may be performed in step S112.

Thereafter, when the region is determined to be the backlash region as a result of the determination, low-pass filtering an impact component to remove an error component including the impact component from the determined actual motor speed may be performed in step S113.

Thereafter, determining a correction factor through monitoring of the output torque may be performed in step S114. The determining a correction factor may be configured to increase the correction factor while approaching a torque of 0 Nm, which is the backlash region, and decrease the correction factor while moving away from the torque of 0 Nm.

Thereafter, determining a corrected model speed, performed so that the low-pass filtered corrected motor speed, the correction factor, the model speed, and the actual motor speed are collected to determine the corrected model speed in which the impact in the backlash region is reflected, may be performed in step S115.

The determining a corrected model speed may include determining a first result value by multiplying the low-pass filtered corrected motor speed by the correction factor, determining a second result value by multiplying the model speed by a value obtained by subtracting the correction factor from a predetermined reference value, and determining the corrected model speed by combining the first result value and the second result value.

Thereafter, extracting a vibration component based on deviation between the determined corrected model speed and the actual motor speed may be performed in step S116.

Thereafter, high-pass filtering the vibration component to remove an error component included in the vibration component may be performed in step S117.

Thereafter, phase-delaying the filtered vibration component for a predetermined time period to compensate for phase antecedence occurring when the vibration component is high-pass filtered may be performed in step S118.

Thereafter, generating an anti-jerk compensation torque by applying a set gain value to the vibration component to which set time phase delay is applied may be performed in step S119. Here, the set gain value may be set based on a traveling mode, gear stage information, and traveling status of the xEV vehicle.

The generating an anti-jerk compensation torque may include not using the anti-jerk compensation torque when the anti jerk compensation torque is less than or equal to a set lower-limit value, and using the anti-jerk compensation torque by limiting the anti-jerk compensation torque to a predetermined value when the anti jerk compensation torque is greater than or equal to a set upper-limit value.

Thereafter, generating a final output torque by combining the anti jerk compensation torque and the driver demand torque may be performed in step S120.

As described above, the method of controlling anti jerk of an xEV vehicle of the present disclosure may determine a model speed correction factor in the driveline backlash region when driving/regenerative switching is performed.

In the present disclosure, the correction factor may be increased when output around a region with an output torque of 0 Nm, which is the driveline backlash region, and decrease the correction factor after passing the backlash region.

The present disclosure may correct the model speed in the driveline backlash region. For example, in the present disclosure, the low-pass filter 224 may be applied to the detected or measured actual motor speed to determine the actual motor speed in which the vibration component is removed and the backlash impact is included.

Thereafter, the actual motor speed and the model speed determined by use of the determined correction factor may be combined to correct the model speed, generating a corrected model speed.

Furthermore, in the present disclosure, a high-pass filter may be applied to remove an error from a vibration component. For example, in the present disclosure, even if a time constant including the same size as that of the related art method is applied to the high-pass filter, the error may be small, and thus the distortion may be small.

In the present disclosure, the backlash impact, from which the error component is removed by the low-pass filter 224, is applied to the model speed before the high-pass filter is applied, and thus, the error of the vibration component is relatively small. Accordingly, a time constant of the high-pass filter greater than that of the related art method may be applied, effectively reducing the occurrence of distortion.

As described above, in the present disclosure, after removing the error component by passing the measured motor speed through a low-pass filter, only the backlash impact component is included, and when the same is substituted into the model speed, only the component generated by the backlash impact may be included in the model speed. Therefore, in the present disclosure, most errors may be removed when extracting vibration components through the high-pass filter, preventing the vibration components from being distorted.

Figure 7:
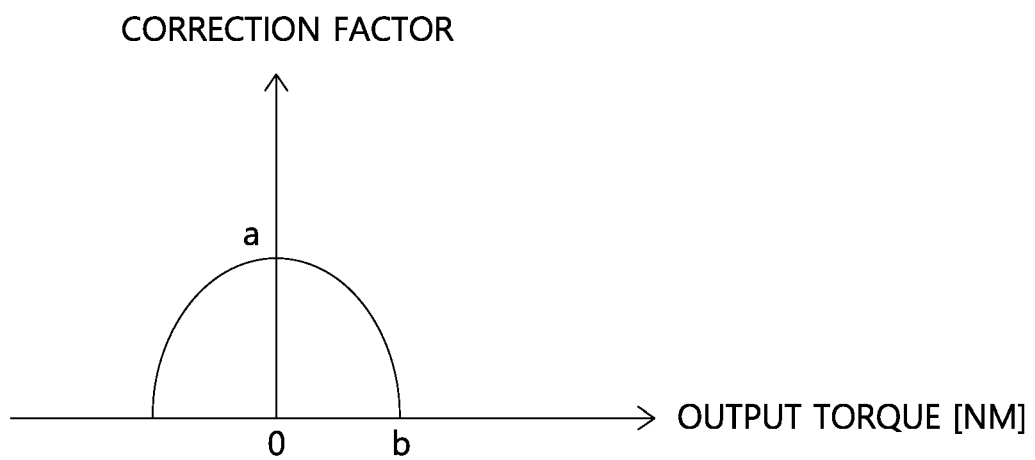
FIG. 7 is a diagram for explaining a method of determining a correction factor according to an exemplary embodiment of the present disclosure.

FIG. 7 is a diagram for explaining a method of determining a correction factor according to an exemplary embodiment of the present disclosure.

Referring to FIG. 7, the horizontal direction may indicate an output torque and the vertical direction may indicate a correction factor. The correction factor may be determined as $0.5 < a < 1$, $5 < b < 10$ Nm in the backlash region.

The backlash region may be a region in which the direction of the output torque is switched. For example, the determination unit 221 may determine a region in which the direction of output torque is switched from a positive driving torque to a negative regenerative torque (+ driving torque→− regenerative torque) or switched from a negative regenerative torque to a positive driving torque (− regenerative torque→+ driving torque) as the backlash region.

The corrector 226 may perform determination so that the correction factor increases while approaching the output torque 0 Nm, which is the backlash region, and the correction factor decreases while moving away from the output torque 0 Nm based on the backlash region determined by the determination unit 221 under the control of the motor control unit. In other words, the corrector 226 may correct the model speed in the vicinity of 0 Nm, which is the backlash region, under the control of the motor control unit using the correction factor, and may use the existing model speed in other regions.

Figure 8:
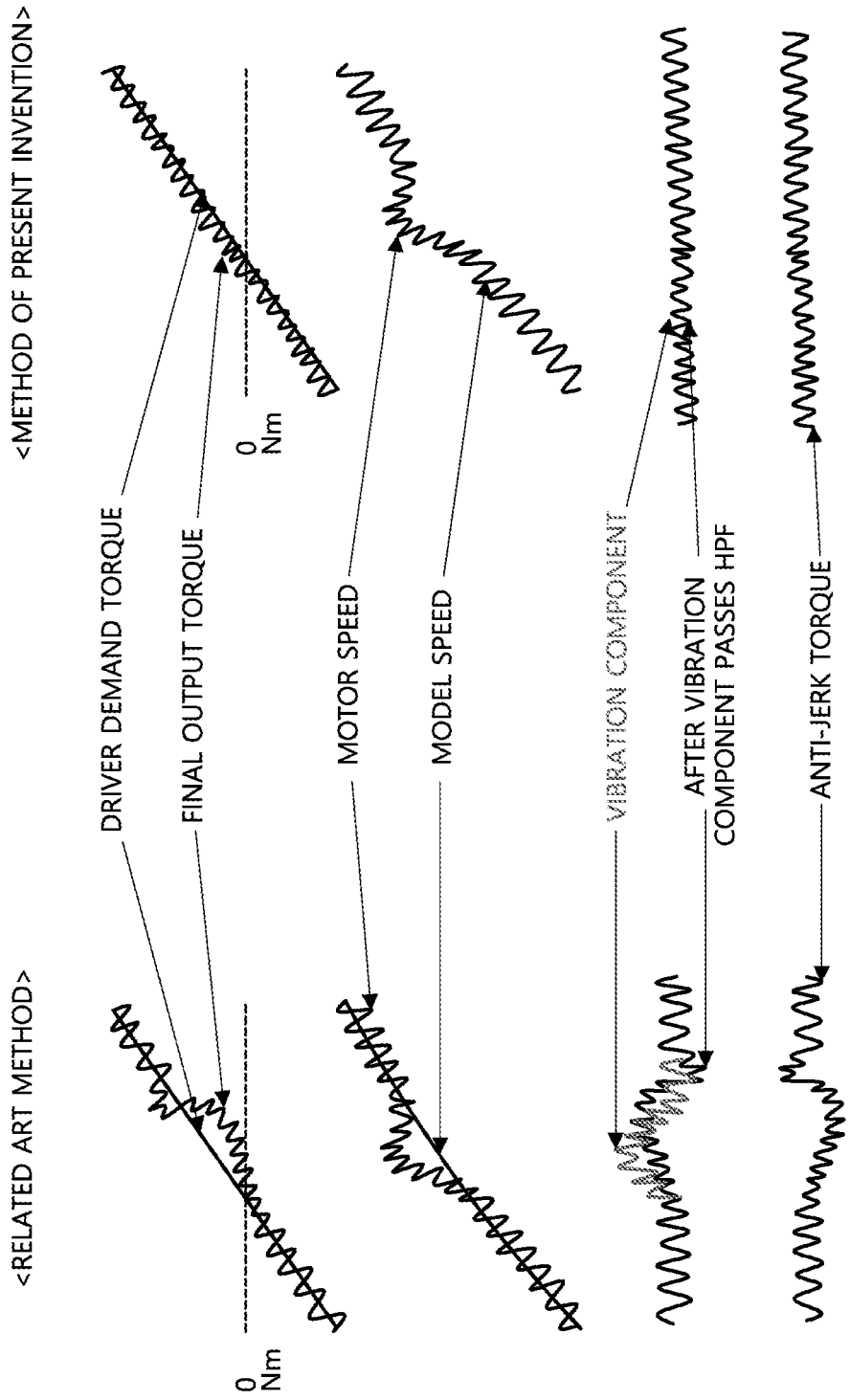
FIG. 8 is a diagram for explaining a vibration output by a method of controlling anti jerk of an xEV vehicle according to an exemplary embodiment of the present disclosure.

FIG. 8 is a diagram for explaining vibrations output by a method of controlling anti jerk of an xEV vehicle according to an exemplary embodiment of the present disclosure.

Referring to FIG. 8, when the direction of the output torque is changed due to driving/regenerative switching (+ driving torque→− regenerative torque or − regenerative torque→+ driving torque), driveline backlash impact may be generated.

In the related art method, the motor speed greatly changed by the backlash impact is extracted as a vibration component. The present low-pass large vibration component is different from the vibration component to be controlled by the anti jerk control method so that severe distortion occurs after passing through the high-pass filter.

Accordingly, a difference between the driver demand torque and the final output torque is generated to thereby decrease the sense of acceleration and then suddenly increase the same, resulting in a problem of a double-sense of acceleration.

In other words, the moment when the acceleration suddenly increases, impact may sometimes be accompanied. To solve the present problem, in the present disclosure, the vibration component is not included when the vibration component is extracted by reflecting the change in motor speed occurred in the backlash region on the model speed.

In other words, in the present disclosure, the actual motor speed of the vehicle is passed through the low-pass filter 224 first, including the backlash impact component and removing the vibration component. When the backlash impact component from which the error component has been removed is applied to the model speed, only the backlash impact component generated by the backlash impact may be included in the model speed. Accordingly, the present disclosure may extract the vibration component from which the error component is removed. Accordingly, according to an exemplary embodiment of the present disclosure, a distorted part may be improved by passing the vibration component from which the error has been removed through the high-pass filter.

In at least an exemplary embodiment of the present disclosure configured as described above, a method and a system for controlling anti jerk of an xEV vehicle may correct a model speed in consideration of an impact generated in a backlash region while controlling anti jerk to thereby effectively reduce vibration and improve drivability.

In the present disclosure, a problem of erroneous extraction of vibration components due to backlash impact when reducing vibration through anti jerk control of an electric vehicle is solved, reducing the impact generated when passing through the driveline backlash region due to driving/regenerating switching.

In the present disclosure, a problem of erroneous extraction of vibration components due to backlash impact when reducing vibration through anti jerk control of an electric vehicle is solved, improving a double-sense of acceleration/deceleration when passing the driveline backlash region by driving/regenerative switching.

In the present disclosure, a problem of erroneous extraction of vibration components due to backlash impact when reducing vibration through anti jerk control of an electric vehicle is solved, solving the problem in which a final output becomes insufficient or large compared to a driver demand torque while driving/regenerative switching.

The present disclosure may be implemented as computer-readable code in program-recorded media. The computer readable medium includes all kinds of recording devices in which data readable by a computer system is stored. Examples of such computer-readable media may include a hard disk drive (HDD), a solid state disk (SSD), a silicon disk drive (SDD), ROM, RAM, CD-ROM, magnetic tape, a floppy disk, an optical data storage element and the like.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling anti jerk of an xEV vehicle using power of a motor, the method comprising:
determining whether a region is a backlash region where a direction of output torque of the motor is changed due to driving or regenerative switching;
determining a model speed of the motor and an actual motor speed of the motor;
low-pass filtering an impact component to remove an error component including the impact component from the determined actual motor speed when the region is determined to be the backlash region as a result of the determining whether a region is a backlash region;
determining a correction factor through monitoring of the output torque;
determining a corrected model speed in which an impact in the backlash region is reflected by collecting the low-pass filtered corrected motor speed, the correction factor, the model speed, and the actual motor speed;

extracting a vibration component based on deviation between the determined corrected model speed and the actual motor speed;

high-pass filtering the vibration component to remove an error component included in the vibration component;

phase-delaying the filtered vibration component for a predetermined time period to compensate for phase antecedence occurring when the vibration component is high-pass filtered; and generating an anti-jerk compensation torque by applying a set gain value to the filtered vibration component to which set time phase delay is applied.

2. The method of claim 1, wherein the determining whether a region is a backlash region, includes determining a region in which the direction of the output torque is changed from a positive driving torque to a negative regenerative torque or switched from the negative regenerative torque to the positive driving torque as the backlash.

3. The method of claim 1, wherein the determining a corrected model speed includes:

determining a first result value by multiplying the low-pass filtered corrected motor speed by the correction factor;

determining a second result value by multiplying the model speed by a value obtained by subtracting the correction factor from a predetermined reference value; and determining the corrected model speed by combining the first result value and the second result value.

4. The method of claim 3, wherein the set gain value is set based on a traveling mode, gear stage information, and traveling status of the xEV vehicle.

5. The method of claim 4, wherein the determining a correction factor is configured to:

increase the correction factor while approaching a torque of 0 Nm, which is the backlash region, and decrease the correction factor while moving away from the torque of 0 Nm.

6. The method of claim 1, further including generating a final output torque by combining the anti-jerk compensation torque and a driver demand torque.

7. The method of claim 1, wherein the generating an anti-jerk compensation torque further includes not using the anti-jerk compensation torque when the anti-jerk compensation torque is less than or equal to a set lower-limit value.

8. The method of claim 1, wherein the generating an anti-jerk compensation torque further includes using the anti-jerk compensation torque by limiting the anti-jerk compensation torque to a predetermined value when the anti jerk compensation torque is greater than or equal to a set upper-limit value.

9. A non-transitory computer-readable recording medium configured to record a program for executing the method of controlling the anti jerk of the xEV vehicle of claim 1.

10. A system for controlling anti jerk of an xEV vehicle using power of a motor, the system comprising:

a battery configured to supply driving power to the motor;

a battery control unit (BCU) configured to manage and control charging and discharging of the battery; and a motor control unit (MCU) configured to control driving of the motor, wherein the motor control unit is configured to execute a command for performing the method of claim 1.

11. The system of claim 10, wherein the motor control unit includes:

a determination unit configured to determine whether the region is the backlash region where the direction of the output torque of the motor is changed due to the driving or regenerative switching;

an actual speed calculator configured to determine the actual motor speed of the motor;

a model speed calculator configured to determine the model speed of the motor;

a low-pass filter configured to low-pass filter the impact component to remove the error component including the impact component from the determined actual motor speed when the determination unit concludes that the region is the backlash region;

a corrector configured to determine the correction factor through monitoring of the output torque;

a corrected model speed calculator configured to determine the corrected model speed in which the impact in the backlash region is reflected by collecting the low-pass filtered corrected motor speed, the correction factor, the actual motor speed, and the model speed;

a vibration component calculator configured to determine the vibration component based on the deviation between the corrected model speed and the actual speed;

a high-pass filter configured to high-pass filter the vibration component to remove the error component included in the vibration component determined in the vibration component calculator;

a phase delay unit configured to phase delay the filtered vibration component for the predetermined time period to compensate for the phase antecedence occurring when the vibration component is high-pass filtered by the high-pass filter; and an anti-jerk compensation torque generator configured to generate the anti-jerk compensation torque by applying the set gain value to the filtered vibration component to which the set time phase delay is applied.

12. The system of claim 11, wherein the determination unit is configured to determine the region in which the direction of the output torque is changed from a positive driving torque to a negative regenerative torque or switched from the negative regenerative torque to the positive driving torque as the backlash.

13. The system of claim 11, wherein the corrected model speed calculator includes:

a first result calculator configured to determine a first result value by multiplying the low-pass filtered corrected motor speed by the correction factor;

a second result calculator configured to determine a second result value by multiplying the model speed by a value obtained by subtracting the correction factor from a predetermined reference value; and a calculator configured to determine the corrected model speed by combining the first result value and the second result value.

14. The system of claim 13, wherein the set gain value is set based on a traveling mode, gear stage information, and traveling status of the xEV vehicle.

15. The system of claim 14, wherein the corrector is configured to:

increase the correction factor while approaching a torque of 0 Nm, which is the backlash region, and decrease the correction factor while moving away from the torque of 0 Nm.

16. The system of claim 11, further including a final output torque unit configured to generate a final output torque by combining the anti-jerk compensation torque and a driver demand torque.

17. The system of claim 11, wherein the anti jerk compensation torque generator is configured not to use the anti-jerk compensation torque when the anti-jerk compensation torque is less than or equal to a set lower-limit value.

18. The system of claim 11, wherein the anti jerk compensation torque generator is configured to use the anti-jerk compensation torque by limiting the anti-jerk compensation torque to a predetermined value when the anti jerk compensation torque is greater than or equal to a set upper-limit value.

* * * * *